(No Model.)
J. H. TARDY.
SLAUGHTER HOUSE HOIST.
No. 385,969. Patented July 10, 1888.
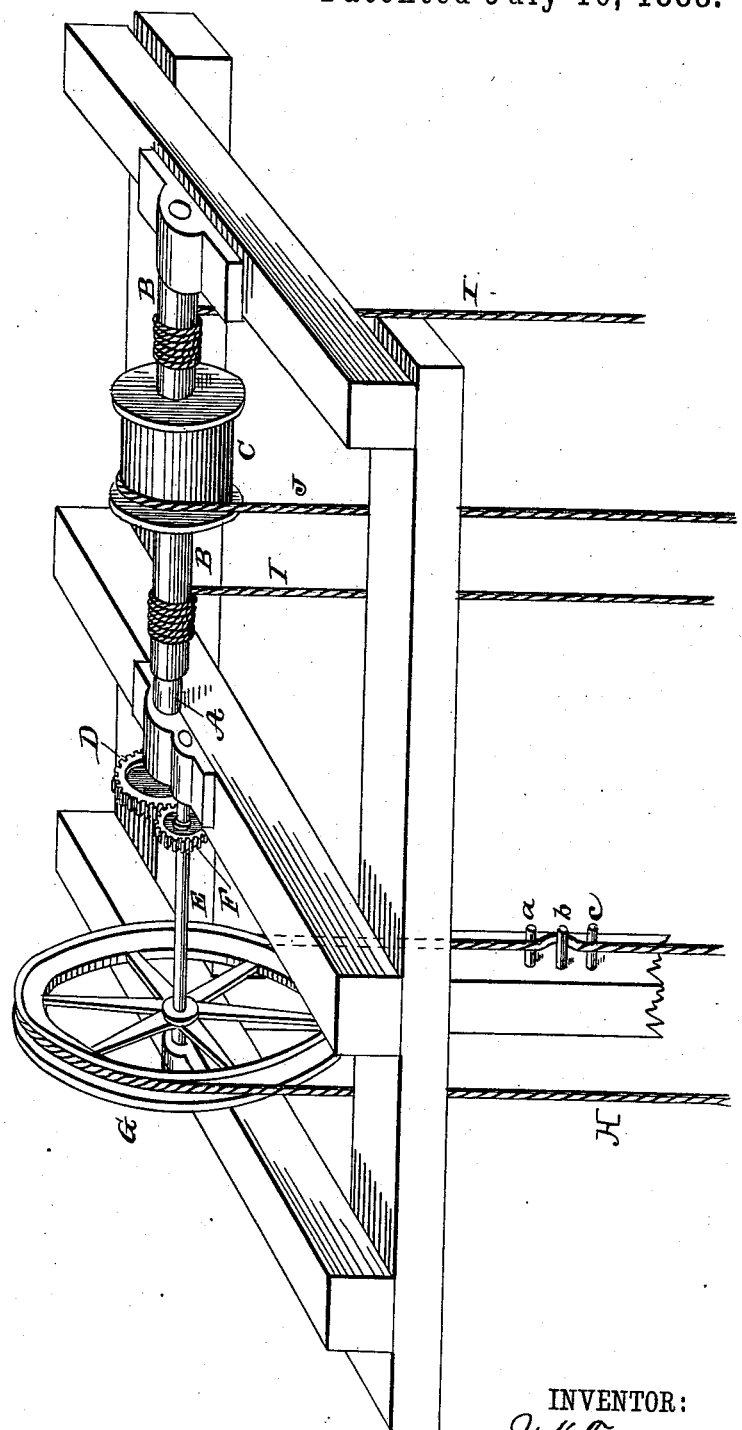
WITNESSES:
D. D. Mott
C. Sedgwick
INVENTOR:
J. H. Tardy
BY Munn & Co
ATTORNEYS.

UNITED STATES PATENT OFFICE.

JULES H. TARDY, OF GLENCOE, MINNESOTA.

SLAUGHTER-HOUSE HOIST.

SPECIFICATION forming part of Letters Patent No. 385,969, dated July 10, 1888.

Application filed December 15, 1887. Serial No. 257,948. (No model.)

*To all whom it may concern:*

Be it known that I, JULES H. TARDY, of Glencoe, in the county of McLeod and State of Minnesota, have invented a new and Improved Slaughter-House Hoist, of which the following is a specification, reference being had to the accompanying drawing, which is a perspective view.

The object of my invention is to provide a hoist for slaughter-houses in which the weight of a heavy animal is employed for raising a lighter animal.

My invention consists in a hoisting-machine having drums of two diameters, the smaller drum being for raising the heavier animals and the larger drum for raising the lighter animals, the ropes or chains upon the two drums being wound oppositely with respect to each other.

In suitable bearings on the timbers of the slaughter-house is journaled the windlass-shaft A, carrying the small drum B and the larger drum, C. Upon the shaft A is secured a spur-wheel, D, and upon the shaft E, journaled in suitable fixed bearings, is mounted a pinion, F, which engages the spur-wheel D. To the shaft E is secured a grooved wheel, G, for receiving the endless rope H, employed in operating the hoist.

To the small drum B is secured a rope, I, and to the larger drum, C, is secured a rope, J. The ropes I J are wound in opposite directions around their respective drums, so that bodies suspended from them will counterbalance or oppose each other. When necessary, the endless rope H is prevented from moving by introducing it between three parallel pins, *a b c*, projecting from the framework of the hoist.

When large and small animals are to be killed, the rope I is used for raising the heavier animal and the rope J for raising the smaller animal, and in the various manipulations of slaughtering one animal is made to counterbalance or overbalance the other, thus rendering the work light and greatly facilitating the operation.

Usually the heavier animal will be raised first and operated upon, and when ready for discharge from the apparatus the lighter animal will be attached to the rope upon the larger drum and will be raised by the operation of lowering the larger animal.

Having thus described my invention, I claim as new and desire to secure by Letters Patent—.

1. In a slaughter-house hoist, the combination, with the stationary frame-work, of a shaft journaled in said frame, three hoisting-drums on said shaft, a large and two smaller ones, a second shaft in gear with the drum-shaft, and a rope-wheel on said second shaft, substantially as shown and described.

2. In a slaughter-house hoist, the combination, with the main shaft, and with three hoisting-drums on said shaft, and a suspended hoisting-rope on each of said drums, the hoisting-rope of the larger drum being wound in the opposite direction to those of the smaller drums, of a second shaft in gear with the drum-shaft and a rope-wheel on the second shaft, substantially as shown and described.

3. A slaughter-house hoist comprising a suitable frame, a shaft, A, journaled therein, large hoisting-drum C on said shaft, and smaller hoisting-drums, B B, at the sides of drum C, hoisting-rope J on drum C, and hoisting-ropes I I on drums B, the said shaft having a gear-wheel, D, a second shaft, E, having a gear-wheel, F, in mesh with the gear-wheel D, and a rope-wheel, G, on shaft E, for operating the hoist, substantially as described.

4. A hoisting apparatus for slaughter-houses, comprising the frame, the shaft A, journaled thereon, large hoisting-drum C thereon, its hoisting-cable J, smaller hoisting-drums, B B, also on shaft A, having their hoisting-cables I wound in the same direction, but opposite to that of the larger drum, and gearing connected with shaft A for rotating it independently of either of said drums, substantially as set forth.

JULES H. TARDY.

Witnesses:
JOHN LINTEN,
SAML. P. BROWN.